Aug. 8, 1944.  F. F. HOLSTEIN  2,355,161
MAGNIFYING ATTACHMENT FOR RULES
Filed Dec. 10, 1942
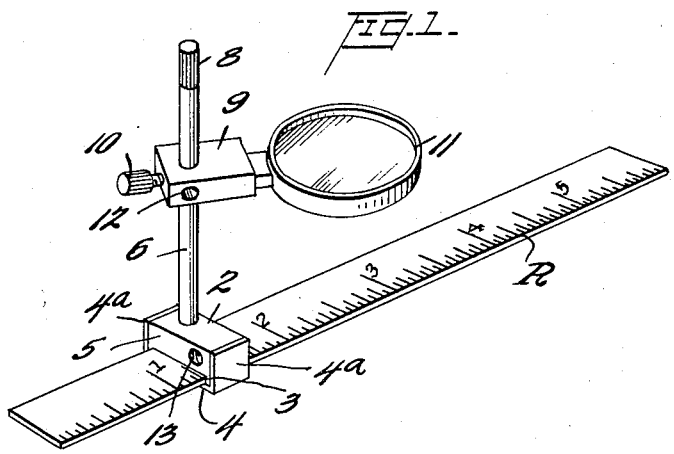
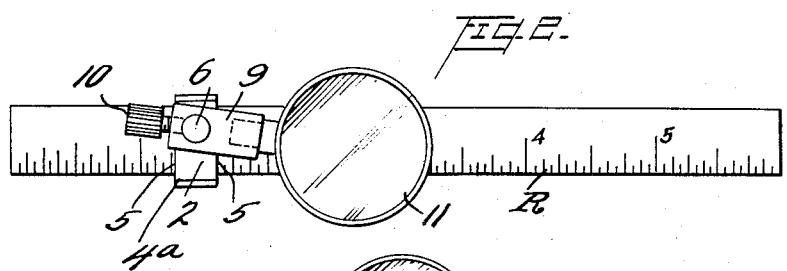
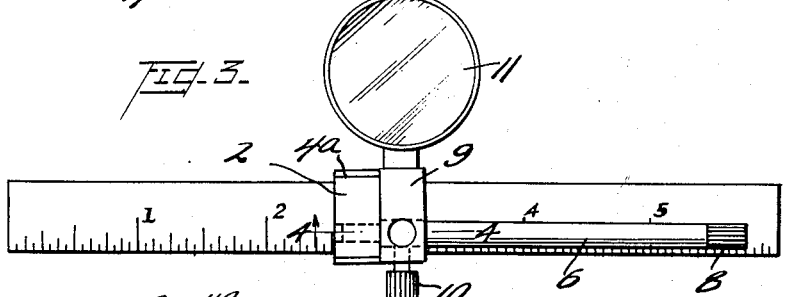
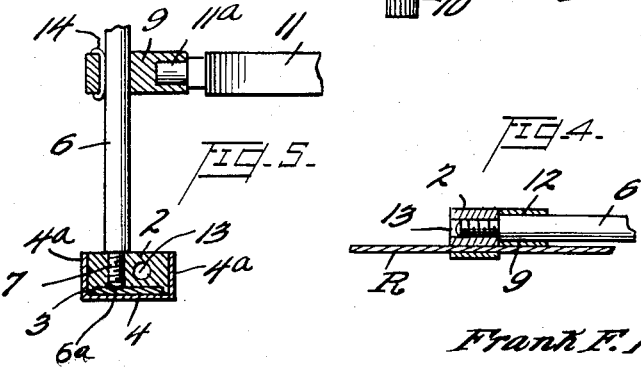
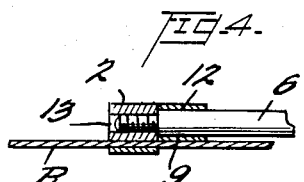
Inventor
Frank F. Holstein,
By
Attorney Patented Aug. 8, 1944

2,355,161

UNITED STATES PATENT OFFICE 2,355,161

MAGNIFYING ATTACHMENT FOR RULES

Frank F. Holstein, Capitol View, Md.

Application December 10, 1942, Serial No. 468,558

2 Claims. (Cl. 88—39)

This invention relates to magnifying attachments for rules and particularly for machinists' rules in which the divisions of the scales are ordinarily arranged so close together as to make it difficult to obtain accurate readings with the unaided eye.

An important object of my invention is to provide an adjustable focusing magnifying attachment adapted to be readily associated with the usual machinists' rule without requiring alteration to the rule structure.

Another object of my invention is to provide a magnifying attachment of the above character in which the magnifying lens forming part of the attachment is adjustable perpendicularly to the rule to bring the scale divisions into clear focus.

Still another object of the invention is to provide a magnifying attachment of the above character which is capable of being swung through an arc of 180 degrees parallel to the rule in order to permit magnified scale readings at either end of the rule.

The invention has as another object to provide a magnifying attachment of the above character that is adapted to be knocked down into compact condition so that it may be conveniently carried in the coat or vest pocket.

Other objects and advantages will be apparent from the following detailed description of a preferred embodiment of the invention, reference being had to the annexed drawing in which:

Figure 1 is a perspective view of a magnifying attachment associated with a machinists' rule;

Figure 2 is a plan view;

Figure 3 is a plan view showing the attachment reassembled in flat condition for carrying in the pocket;

Figure 4 is a detail cross-sectional view on the line 4—4 of Fig. 3; and

Figure 5 is a detail cross-sectional view showing alternative means for supporting the lens-carrying arm in position.

The adjustable magnifying attachment 1 shown in the drawing is adapted to be used in conjunction with a conventional machinists' steel rule R having scale markings stamped along its longitudinal edges, some of which may be in divisions of 1/64th inch and therefore difficult for a person of average eyesight to read with the unaided eye.

The magnifying attachment comprises a rectangular metal slide block 2 having a recess 3 in its bottom surface. A metal strip 4 having upright arms 4a embracing and welded to opposite ends of the block extends across and closes the open side of the recess. The recess 3 in conjunction with the strip 4 forms a rectangular-shaped opening for snugly and slidably receiving the rule R. The block upon its opposite sides is formed with flat faces 5 adapted to overlie and cooperate with the scale markings so as to aid in making scale readings, or to serve as abutments for the work.

Extending upwardly from the block and perpendicularly to the rule is a post 6, the lower end of which is exteriorly screw-threaded so as to screw into an internally screw-threaded opening 7 which opens into the recess 3. The top of the post is formed with an integral finger-piece 8 for rotating the post to screw its lower end 6a into and out of clamping engagement with the rule.

Adjustable longitudinally of the post is an arm 9 having an opening through which the post extends and a set-screw 10 threaded inwardly from the inner end of the arm so as to bind against the post. Supported in the same general plane with the arm 9 is a magnifying lens 11, the handle of which is secured within a socket 11a formed in the outer end of the arm.

From the foregoing description it will be apparent that upon unscrewing the post 6 by means of the finger-piece 8 to release the rule R, the block 2 may be slid along the rule to make a measurement. Then, by screwing the post downwardly, the block may be firmly clamped to the rule and the scale viewed through the lens 11 to obtain a reading. If the portion of the scale to be read lies at the extreme end of the rule, it is only necessary to release the set-screw 10 to allow the lens, on its arm 9, to be swung in a horizontal plane through 180 degrees so as to bring it over the end of the scale to be viewed.

The set-screw 10 also permits raising or lowering the arm 9 on the post to position the lens so that it brings the scale into clear focus. The vertical adjustability of the lens allows it to be set so as to best suit the eyesight of the user and once having been set ordinarily will not have to be changed while the device is being used by the same person.

For convenience in carrying around in the pocket, the focusing attachment may be knocked down into the collapsed condition shown in Fig. 3. To accomplish this, the post 6 is unscrewed from the slide block 2, the set-screw 10 released, and the arm 9 removed from the post. This arm is provided with an opening 12 extending crosswise of the block so that the block may be slipped upon the post and the threaded end of the post screwed into an internally-threaded recess 13 formed in a side face of the block.

In place of the set-screw 10, I may provide a spring 14 for engaging the post and yieldingly retaining the arm in its position of vertical or angular adjustment, as indicated in Fig. 5.

Obviously the device may take other forms than that described above, which is to be regarded as exemplary and not restrictive of the invention, without departing from the spirit of my invention as defined by the following claims:

I claim:

1. A magnifying attachment for rules bearing scale markings upon a side thereof, said attachment comprising a slide block having a recess therethrough closed at its bottom by a relatively thin plate and adapted to receive a rule, a post extending upwardly from said block and having its lower end threadedly mounted in an opening in the top of the block communicating with said recess, whereby rotation of the post moves its lower end into and out of clamping engagement with the rule, an arm slidably adjustable lengthwise of said post and angularly adjustable about said post through an arc of 180 degrees, a magnifying lens supported on said arm and arranged to lie generally parallel to the plane of the rule, and means for retaining said arm in adjusted position on said post.

2. A magnifying attachment as set forth in claim 1 in which the slide block upon a side face is threaded to receive the threaded end of the post and the arm is provided with a transverse opening adapted to receive the post, thus permitting assembly of the parts in a generally flat condition.

FRANK F. HOLSTEIN.